(No Model.)　　　　　W. C. BATEMAN.　　　3 Sheets—Sheet 1.
PLANTER.

No. 438,771.　　　　　　　Patented Oct. 21, 1890.

Witnesses:
J. B. McGirr
Dr. B. May

Inventor:
Walter C. Bateman
by Doubleday & Bliss
attys (No Model.) 3 Sheets—Sheet 2.
W. C. BATEMAN.
PLANTER.
No. 438,771. Patented Oct. 21, 1890.
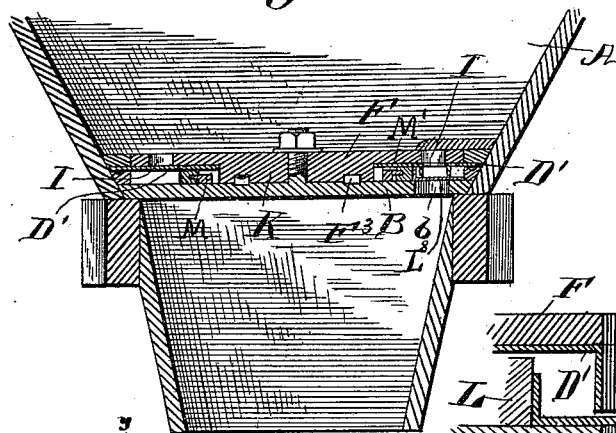
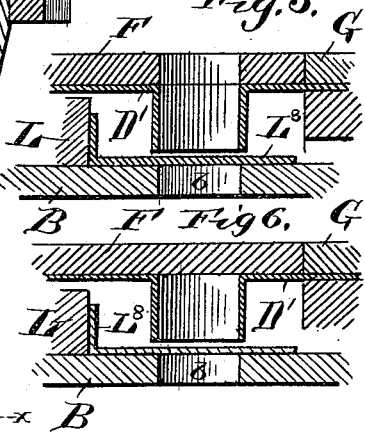
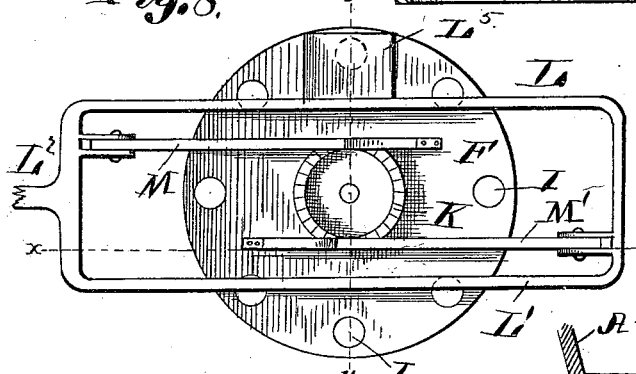
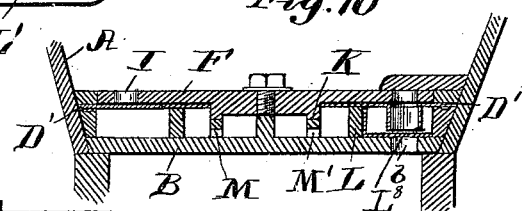
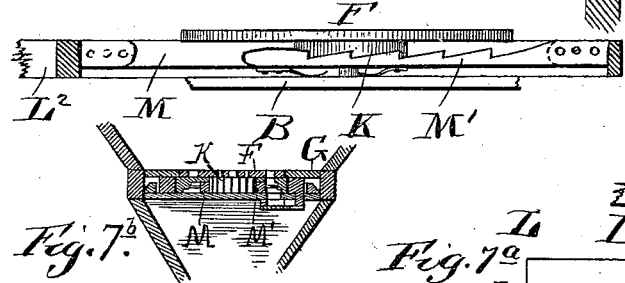
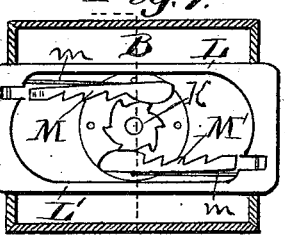
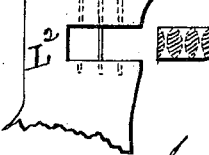
Witnesses: Inventor:
Walter C. Bateman
by Doubleday & Bliss
Attys (No Model.) 3 Sheets—Sheet 3.
W. C. BATEMAN.
PLANTER.
No. 438,771. Patented Oct. 21, 1890.
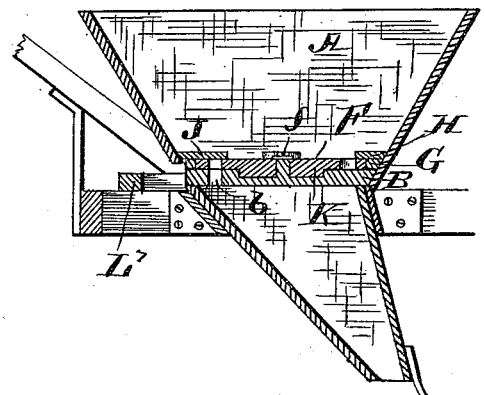
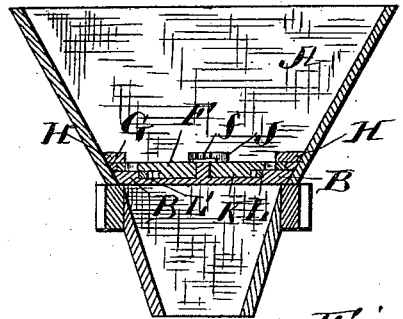
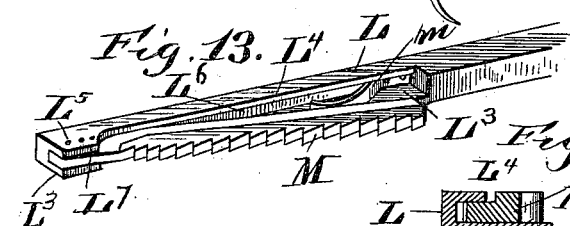
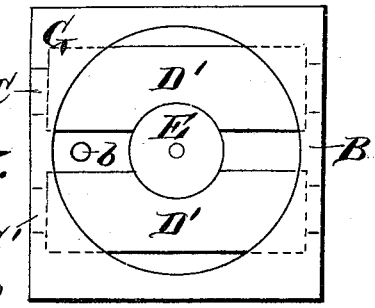
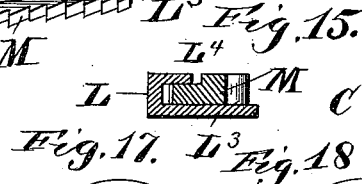
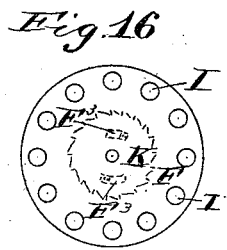
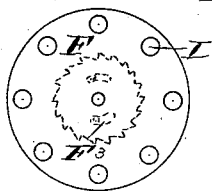
Witnesses:
J. B. McGirr.
M. B. Quay.
Inventor:
Walter C. Bateman
by Doubleday & Bliss
attys
THE NORRIS PETERS CO., PHOTO-LITHO., WASHINGTON, D. C.

UNITED STATES PATENT OFFICE.

WALTER C. BATEMAN, OF KENOMA, MISSOURI.

PLANTER.

SPECIFICATION forming part of Letters Patent No. 438,771, dated October 21, 1890.

Application filed August 12, 1889. Serial No. 320,437. (No model.)

*To all whom it may concern:*

Be it known that I, WALTER C. BATEMAN, a citizen of the United States, residing at Kenoma, in the county of Barton and State of Missouri, have invented certain new and useful Improvements in Planters, of which the following is a specification, reference being had therein to the accompanying drawings.

This invention relates to improvements in corn-planters, the object being to provide a mechanism by which the amount of seed to be dropped at a delivery can be regulated more accurately than is the case with planters of this class as they are now constructed.

Figure 1:
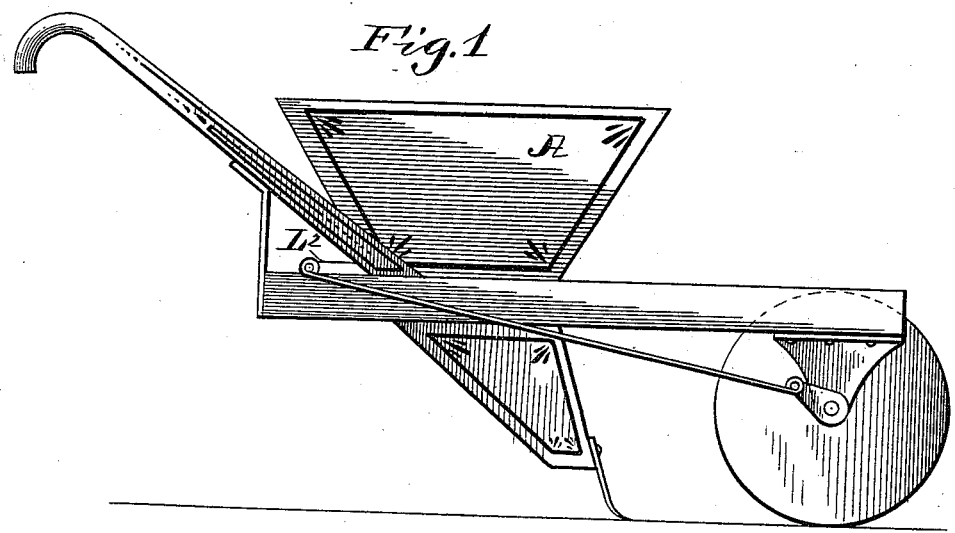
Figure 2:
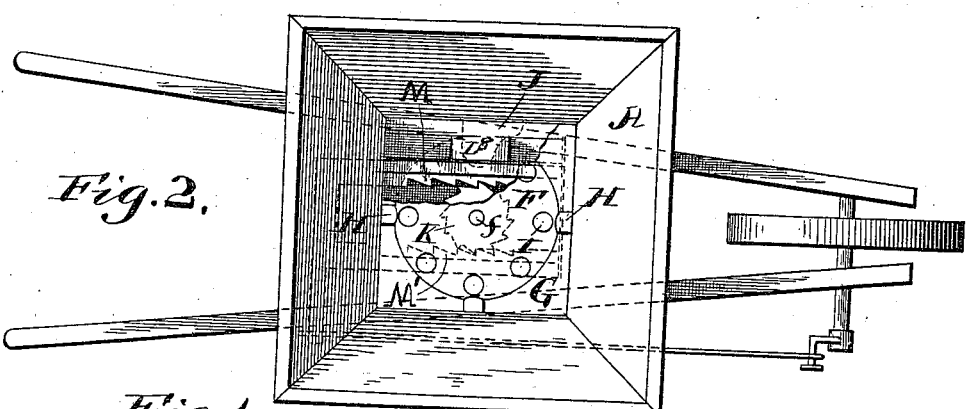
Figure 4:
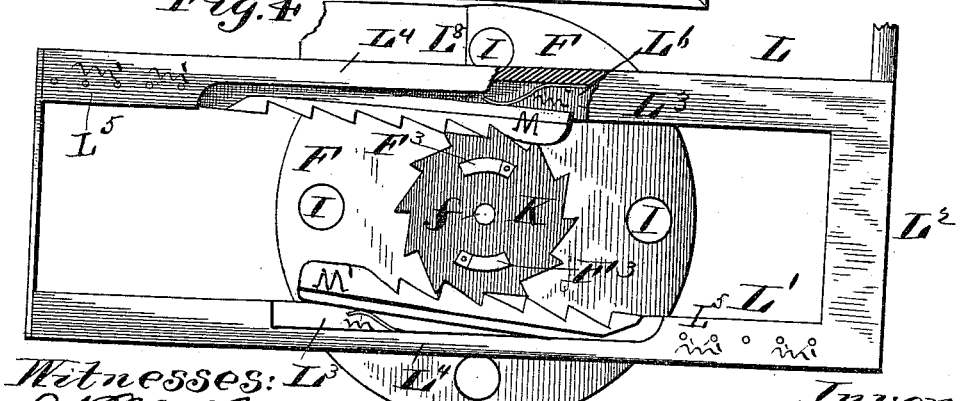

Figure 1 is a side elevation of a planter embodying my improvements. Fig. 2 is a top plan view. Fig. 3 is a section on the line $xx$, Fig. 2. Fig. 4 is a view of one form of dropping-plate with its toothed wheel, the sliding frame, and the rack-bars carried thereby. Fig. 5 is a section, on an enlarged scale, of the details in Fig. 3. Fig. 6 shows the same part in another position. Fig. 7 shows a modified form of frame and rack-bars, Fig. 7$^a$ showing a part of the sliding frame on a larger scale. Fig. 7$^b$ shows a detail sectional view of the lower part of the hopper. Fig. 8 is a plan view of a modified form of corn-plate, toothed wheel, and rack-bars. Fig. 9 is a view, partly in section and partly in elevation, of the parts in Fig. 8. Fig. 10 is a cross-section of a hopper-bottom having the parts applied shown in Figs. 8 and 9. Fig. 11 is a longitudinal section of a hopper and spout of a slightly-modified form. Fig. 12 is a cross-section of the same. Fig. 13 shows in perspective one of the rack-bars and its support. Fig. 14 is a plan view of the hopper-bottom and the parts secured thereto shown in Figs. 11 and 12. Fig. 15 is a cross-section of the parts in Fig. 13. Figs. 16, 17, and 18 show some of the various corn-plates that can be used.

The seed carrying and delivering devices can be mounted upon any suitable frame, and with them can be combined any preferred form of devices for preparing and opening the ground, and for covering and packing the same, if necessary, upon the seed after it is dropped.

The seed-dropping mechanism can be used either on a single machine—that is, a machine for one horse—or it can be used on the double planters, or machines in which there are two boxes and two seed-droppers connected together and operated simultaneously.

A represents the hopper or box in which the corn is placed, and from which it is taken by the delivering devices. It may be of any suitable shape and size. The bottom plate is represented by B, and it is provided with an aperture $b$, to which the grain passes from the box to the ground. A pipe or spout may be employed in connection with this aperture for guiding the seed to the proper place.

I will first describe a machine when constructed as shown in Figs. 11, 12, 13, 14, 15, and 16, as that is the simpler form, and I will then call attention to the other figures in which substantially the same features of construction are preserved, although there are some minor changes of structure and arrangement. In the bottom of the box (see Figs. 12 and 14) there are formed two longitudinal guideways C C', either by making grooves in the upper face of the bottom plate B or by securing another plate upon it having such grooves. In the drawings (see Figs. 12 and 14) the manner first above indicated is followed—that is to say, grooves are formed in the bottom plate, and these are closed at the top by means of plates D'. At the center there is a chamber (indicated by E) communicating with the aforesaid grooves or ways C C'.

Above the parts which have been described is placed the feeding-plate F. This is circular and is mounted upon a center stud-shaft $f$, projecting up from the bottom plate B.

G indicates a plate whose thickness is equal to that of the corn-plate F, so that the top surface of the two are in the same plane. The plate G is fitted to the walls of the hopper and has a large center aperture into which is fitted the corn-plate F.

The corn-plate F is held down by means of clips H, which are detachably fastened to the outer plate G. They are detachable in order to permit the corn-dropping plate to be readily removed and another substituted.

I are the apertures formed in the plate F, near the periphery thereof, for receiving the corn and carrying it to the aforesaid aperture $b$ in the bottom plate B. Above the said aperture $b$ there is a cut-off and a cover J. The apertures or seed-cups I are not the comparatively large apertures ordinarily formed in these plates and adapted to receive four, five, or more kernels of corn, but they are small relatively, and each is adapted to receive only a single kernel.

To the bottom of the plate F there is secured or with it there is formed a toothed wheel K, the teeth being of the shape of a ratchet—that is to say, each tooth is formed with one edge thereof much more inclined to the radius than is the other edge.

I will now describe the devices for turning the corn-plate and wheel K, having reference at present to Figs. 11, 12, 13, and 14, in conjunction with Fig. 4, which shows the sliding frame complete.

In the aforesaid guideways C C' there are placed two sliding bars L L'. Preferably they are joined to or cast in one piece, with a sliding piece $L^2$ situated outside of the hopper, and by means of which both of the sliding bars can be moved simultaneously. Each of these bars L L' is recessed, as shown at $L^6$ $L^7$, each recess being of such a nature as to leave a wide wall $L^3$ on one side and a narrow wall $L^4$ on the other side, this narrow wall $L^4$ terminating in an expanded part $L^5$ at the end. The portion $L^6$ of the recess is between the walls $L^3$ and $L^4$, and that part of the recess indicated by $L^7$ is between the wall $L^3$ and the part at $L^5$.

M M' indicate rack-bars, each having ratchet-teeth corresponding to those of the above-described wheel K. The racks are opposite in relation to each other—that is, arranged so that their teeth project in opposite directions. The rack M is pivoted in one of the holes $m'$ to the inner end of the bar L, the pivot passing through the walls $L^3$ $L^5$. The rack M' is similarly pivoted to the outer end of the bar L'. Behind each rack there is placed a spring $m$, which tends to throw the free end of its rack inward toward the wheel K. The rack-bars are adjustable at their heel ends, so that they can be moved out or in, and thus the extent of their engagement with the wheel or plate F can be varied and the planting be changed, so that if it is desired to drop from three holes and next from four it can be accomplished, or any desired regulation can be employed. When the parts L L' $L^2$ are moved in one direction, the rack M engages with the wheel K and imparts a part of a rotation thereto. When the said parts are moved in the other direction, the rack M engages with said wheel and continues to rotate it in the same direction, the rack M now slipping past the wheel without engagement therewith, owing to the shape and relation to the teeth on the racks and on the wheel. The connecting bar or plate $L^2$ can be joined to a pitman or link or other mechanism driven by the ground-wheel.

In Figs. 1 to 6 a machine is shown having the same principles of construction and operation substantially, with some additional matters. In this case the bottom is not grooved out, the sliding frame resting directly upon the top surface thereof. The sliding frame is provided with a valve or cut-off $L^8$, so situated that it lies directly below the apertures I when they are dropping corn, and it at that time closes the aperture $b$ in the bottom. I have found that there is a tendency for the corn to scatter when the parts are so arranged that it drops directly through the bottom from the plate F. By having a sliding valve or cut-off all the kernels can be dropped together. This cut-off or valve may be of any suitable character and situated in any necessary way to effect the desired result. I have also found that there is a tendency for the toothed wheel K to slip backward. I overcome this by employing dogs $F^3$ on the bottom thereof and form recesses in or attach a ratchet or teeth to the upper side of the bottom. This prevents the wheel from turning back after it has been advanced.

If the corn-plate F is at some distance from the bottom, a tubular guide of any suitable sort may be provided, as shown in Figs. 5 and 6.

In Figs. 8, 9, and 10 I have shown a form of mechanism substantially similar to those above described, except that the teeth of the ratchet-wheel are in vertical planes, and the rack-bars M M' are correspondingly situated, and the pivots which hold them to the sliding frame being in this case arranged horizontally.

In Figs. 7 and $7^a$ the toothed wheel has its teeth arranged horizontally instead of vertically, the rack-bars and frame being substantially the same as those shown in Figs. 8 and 9.

Upon reference to Fig. 4 and others, it will be seen that the rack-bar is provided at the end with a non-active part as wide as or a little wider than the teeth. The presence of this insures that only the desired number of teeth shall be caused to act on the wheel. The rack-bars can be adjustable longitudinally, and therefore the paths through which the sliding teeth move can be varied, so as to produce a longer or a shorter engagement of each bar with the wheel, as may be desired. Thus with the same play of the sliding bars the racks may have an engagement of only one of their teeth, or two, three, or more, as is wanted, the rounded, widened, or non-active part at the end insuring that the rack-bar shall ride properly on the points of the teeth of the wheel without engaging therewith.

As said above, the apertures I each receive a single kernel. The racks and the wheel K are so adjusted as to produce about one-fourth of a rotation of the plate F. If it is desired to plant four kernels in each hill, four apertures are made in each quarter of the perforated part of the plate. If a smaller or a larger number of grains are to be dropped, a plate is inserted having therein a number of apertures corresponding to the desired number of kernels to be dropped. If it is desired to plant first a hill with a small number and then one with a large number, it is accomplished by forming in the dropping-plates a series of sets of apertures, there being first a set of a smaller number and then a set of a larger number, first two, then three, or three, and then four, as may be desired.

By having the apertures of such size that each can take only a single kernel of corn I can regulate the seed much more accurately than is the case with machines in which each aperture is intended to take several kernels, and with which use must be made of plates having different-sized apertures in order to vary the feed.

By having the valve or cut-off similar to that attached I am enabled to drop at one spot any desired number of kernels. If the other parts are set for dropping one, or if they are set for dropping six or any other number of kernels, this valve insures that they will all go through the aperture $b$ together. The variations in this respect and for this purpose are facilitated by means of the longitudinal adjustment of the rack-bars.

I am aware of the fact that use has been made of rack-bars both pivoted at the same end, the opposite ends being arranged to vibrate toward and from each other, and for the last said ends being connected together by one or more springs, and I do not claim as my invention such an arrangement of racks; but the construction and arrangement of these parts are materially different in my case. The racks are hinged at opposite ends, the hinge of one rack coming opposite to the free end of the other. As a result of this, the racks move more freely in relation to the wheel and without the friction and wear that is incident to them when they are connected together and mutually press against the wheel.

I am, also, aware that toothed racks and wheels, broadly considered, have been in various mechanisms, as in steam-engines, and I do not claim such devices as my invention.

Heretofore vibrating valves or rocking valves of various sorts have been used below the droppers, but these have required the presence of several supplemental parts which I desire to avoid, and by having a sliding valve of the character I have herein shown I have succeeded in obviating the necessity of these supplemental parts.

It will be understood that the rack-bars herein are in structure, function, and relation to the other parts more or less similar to the pawls that have been used in many ways in planters.

What I claim is—

1. In a planter, the combination, with the removable dropping-plate having through-apertures for the passage of grain and a ratchet-wheel toothed around the entire periphery, of the two independent rack-bars, one pivoted at one end to the frame and the other pivoted at the opposite end, independent springs, one for each rack-bar, and the hopper having its bottom chambered, substantially as described, to receive said springs and bars, as set forth.

2. In a planter, the combination, with the removable dropping-plate having a wheel toothed around its entire periphery, of the sliding bars L L', situated at the side of the wheel, the two independent rack-bars respectively pivoted to the said bars L L', one at the inner end and the other at the outer end, the separate springs bearing against said rack-bars, and the hopper having its bottom chambered, substantially as described, to receive said springs and bars, as set forth.

3. The combination, with the perforated dropping-plate and the slide which intermittingly actuates it, of the sliding valve secured to the said slide and adapted to temporarily cut off the passage of the grain after passing through the plate, substantially as set forth.

4. In a planter, the combination, with the rotating dropping-plate and the toothed wheel which actuates it, of the reciprocating toothed bars having two or more teeth, and also having the non-active parts adapted to rest against the teeth of the wheel without engaging therewith when they are reciprocating, substantially as set forth.

5. In a planter, the combination, with the dropping-plate and the toothed wheel which actuates the same, and the sliding carrier, of the rack-bars secured to the said sliding carrier and longitudinally adjustable thereon, substantially as set forth.

6. In a planter, the combination, with the dropping-plate and the toothed wheel which actuates it, of the reciprocating bars which intermittingly engage with said wheel and the dogs or equivalents on the under side of said plate or wheel and adapted to engage with a stationary part which prevent said wheel from moving backward, substantially as set forth.

In testimony whereof I affix my signature in presence of two witnesses.

WALTER C. BATEMAN.

Witnesses:
DAVID YODER,
JACOB EPPSTEINER.